US007015417B2

(12) United States Patent
Takikawa et al.

(10) Patent No.: US 7,015,417 B2
(45) Date of Patent: Mar. 21, 2006

(54) WORKPIECE WELDING PROCESS

(75) Inventors: Masato Takikawa, Saitama (JP); Takanori Yahaba, Saitama (JP); Yasutomo Ichiyama, Chiba (JP); Toshiyasu Ukena, Tokyo (JP); Hirobumi Sonoda, Chiba (JP); Kenji Okuyama, Chiba (JP); Junichi Ibukuro, Chiba (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/399,864

(22) PCT Filed: Sep. 13, 2002

(86) PCT No.: PCT/JP02/09433

§ 371 (c)(1),
(2), (4) Date: Apr. 28, 2003

(87) PCT Pub. No.: WO03/024658

PCT Pub. Date: Mar. 27, 2003

(65) Prior Publication Data

US 2004/0000539 A1 Jan. 1, 2004

(30) Foreign Application Priority Data

Sep. 17, 2001 (JP) ............................ 2001-281725

(51) Int. Cl.
*B23K 26/00* (2006.01)
*B23K 9/00* (2006.01)

(52) U.S. Cl. ......................... 219/121.64; 219/137 WM

(58) Field of Classification Search ........... 219/121.63, 219/121.64, 137 R, 137 WM
See application file for complete search history.

(56) References Cited

U.S. PATENT DOCUMENTS

| | | | | |
|---|---|---|---|---|
| 4,507,540 A * | 3/1985 | Hamasaki | .............. | 219/121.64 |
| 5,821,493 A * | 10/1998 | Beyer et al. | ........... | 219/121.46 |
| 5,859,402 A * | 1/1999 | Maier | .................... | 219/121.64 |
| 5,866,870 A * | 2/1999 | Walduck | ................ | 219/121.45 |
| 6,034,343 A * | 3/2000 | Hashimoto et al. | ........... | 219/74 |
| 6,191,379 B1 * | 2/2001 | Offer et al. | ................... | 219/75 |
| 6,608,285 B1 * | 8/2003 | Lefebvre et al. | ........ | 219/137 R |
| 2002/0008094 A1 * | 1/2002 | Briand et al. | ........... | 219/137 R |

FOREIGN PATENT DOCUMENTS

| | | | |
|---|---|---|---|
| DE | 196 08 074 A1 | | 9/1997 |
| DE | 199 16 831 A1 | * | 10/2000 |
| JP | 1-241392 | * | 9/1989 |

(Continued)

OTHER PUBLICATIONS

Abe et al., "Dynamic Observation of High Speed Laser-Arc Combination Welding of Thick Steel Plates", Transactions of JWRI, Joining and Welding Research Institute Osaka University, 1997, vol. 26, No. 2, pp. 7-11.*

(Continued)

*Primary Examiner*—Kevin P. Kerns
(74) *Attorney, Agent, or Firm*—Arent Fox PLLC

(57) ABSTRACT

A laser light L is emitted from a laser light source 6 to workpieces 1, 2, to form a laser molten weld pool 3, and immediately thereafter, an arc molten weld pool 4 is formed using an arc welding machine 7; thereby plates 1, 2 are welded. The arc welding machine 7 is provided with a filler wire to form a bead 5 on the plate 1. With the welding process according to the present invention, workpieces can be efficiently and securely welded regardless of shape and material of the workpieces.

6 Claims, 3 Drawing Sheets

FOREIGN PATENT DOCUMENTS

| | | | | |
|---|---|---|---|---|
| JP | 1-241392 | A | | 9/1989 |
| JP | 6-254689 | | * | 9/1994 |
| JP | 10-272578 | | * | 10/1998 |
| JP | 10-272578 | A | | 10/1998 |
| JP | 2000-280080 | | * | 10/2000 |
| JP | 2001-246465 | | * | 9/2001 |
| JP | 2001-246465 | A | | 9/2001 |
| JP | 2002-144064 | A | | 5/2002 |

OTHER PUBLICATIONS

Mano et al., "Laser-Arc Fukugo ni yoru Koban no Kosokudo Yosetsu", Japan Welding Society Zenkoku Taikai Koen Gaiyo, Shadan Hojin Japan Welding Society, 59th Series, 1996, pp. 86-87.*

Makino et al., "Laser-Arc Fukugo ni yoru Koban no Kosokudo Yosetsu", Japan Welding Society Zenkoku Taikai Koen Gaiyo, Shadan Hojin Japan Welding Society, 59th Series, 1996, pp. 86-87.*

Nobuyuki Abe et al., Dynamic Observation of High Speed Laser-Arc Combination Welding of Thick Steel Plates, Transactions of JWRI, Joining and Welding Research Institute Osaka University, 1997, vol. 26, No. 2, pp. 7 to 11.

Ken Mano et al., "Laser-Arc Fukugo ni yoru Koban no Kosokudo Yosetsu", Japan Welding Society Zenkoku Taikai Koen Gaiyo, Shadan Hojin Japan Welding Society, 59th series, 1996, pp. 86 to 87. Japanese Text—Only Drawings Considered.

* cited by examiner

WORKPIECE WELDING PROCESS

TECHNICAL FIELD

This invention relates to a welding process performed utilizing a high-density energy beam and an arc discharge.

BACKGROUND ART

Welding processes used for welding a workpiece in the form of a sheet, plate or the like includes: welding which utilizes a high-density energy beam such as a laser light and an electron beam, and arc welding such as MIG (Metal Inert Gas) welding and TIG (Tungsten Inert Gas) welding.

The welding with a high-density energy beam is a process in which density of energy applied to a workpiece is very high, and thus incorporates advantageous features such as a higher welding speed and a narrower width of a bead formed on the workpiece during the welding process.

In contrast, the arc welding is a process in which a larger amount of energy may be applied to a workpiece per unit of time, despite a lower welding speed, and may thus lend itself to welding of a thick plate. The arc welding also has the advantage of improved quality of a welded portion because a metal filler wire melts and thereby forms a collar on the welded portion.

In the welding utilizing a high-density energy beam, however, the ratio of spread versus penetration of the weld is smaller, and thus when thick plates were overlapped and welded together, a welded area of the workpieces would be so small that a desirable level of welding strength could not be secured on some occasions.

On the other hand, the arc welding would cause distortion of the weld to occur in some instances as a result of a great amount of energy applied; therefore, it should be noted that variations in the quality of welded surfaces might be produced by instability of arc discharge. Moreover, the arc welding also has the disadvantage of a lower welding speed.

DISCLOSURE OF THE INVENTION

Accordingly, it is an object of the present invention to provide a welding process that can weld a workpiece efficiently and securely irrespective of shape and material of the workpiece.

A workpiece welding process according to one exemplified aspect of the present invention is a welding process for welding a workpiece which forms a molten portion on the workpiece by emitting a high-density energy beam thereto, and thereafter generates an arc discharge while supplying a filler wire to the molten portion, to weld the workpiece.

This workpiece welding process is designed to accelerate a welding speed by welding with a high-density energy beam which is carried out in advance, while expanding the welded portion formed by the high-density energy beam, utilizing an arc discharge that follows, to obtain a higher welding strength.

In the above workpiece welding process, a distance between a central position of the molten portion formed by emitting the high-density energy beam thereto and a central position of a molten weld pool formed by the arc discharge may be longer than 0 mm, and may be 4 mm at the maximum, in a welding direction.

The workpiece welding process is designed to effectively utilize thermal energy contained in the high-density energy beam by controlling the above distance, and to reduce the amount of energy to be provided to an arc welding machine, so that energy efficiency as a whole may be enhanced.

MODE(S) FOR CARRYING OUT THE INVENTION

A detailed description will be given of an embodiment of the present invention.

Figure 1:
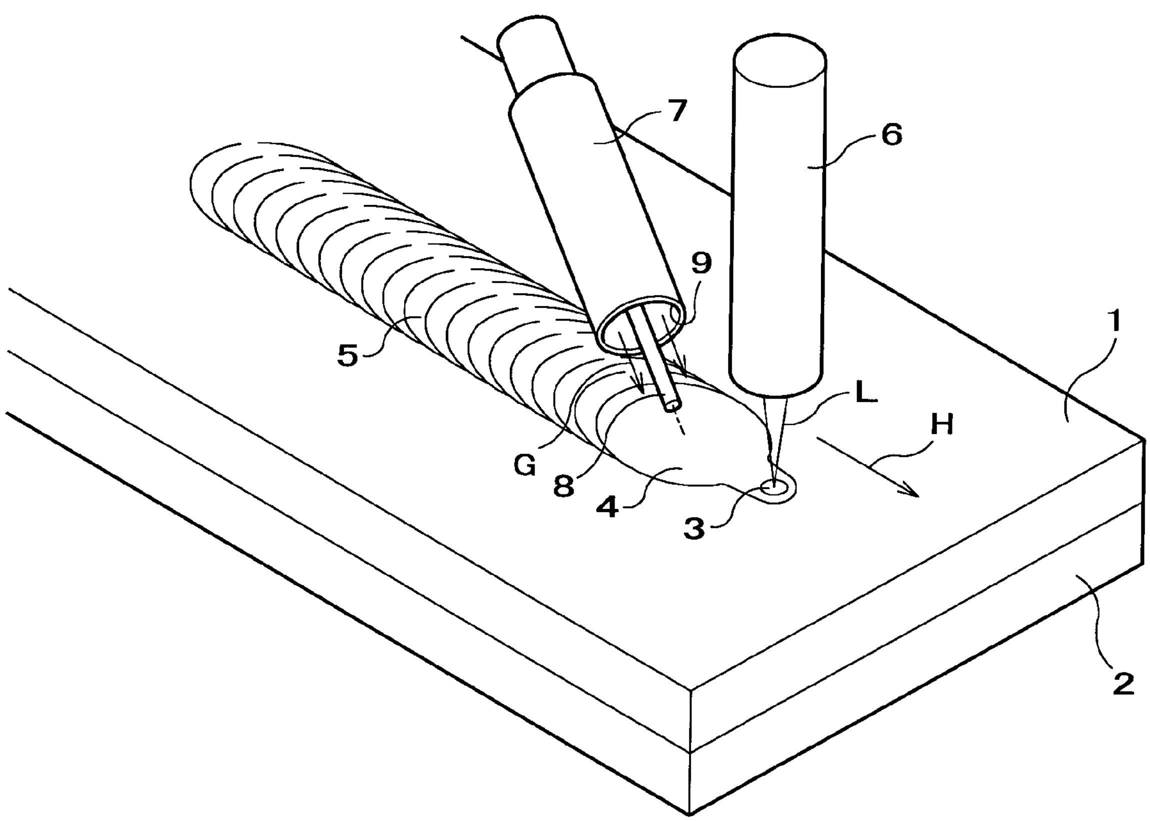
FIG. 1 is a perspective view illustrating a workpiece welding process according to an embodiment of the present invention.
Figure 2:
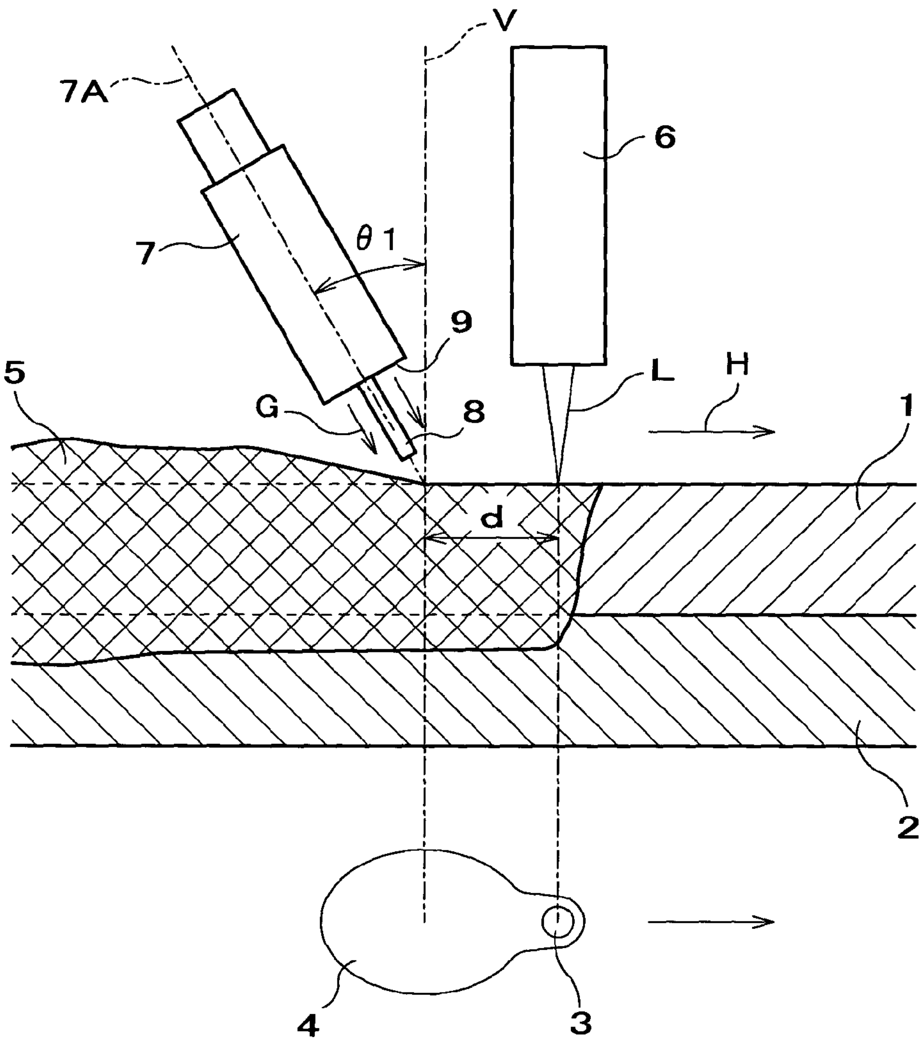
FIG. 2 is a side view in cross section of FIG. 1.
Figure 3:
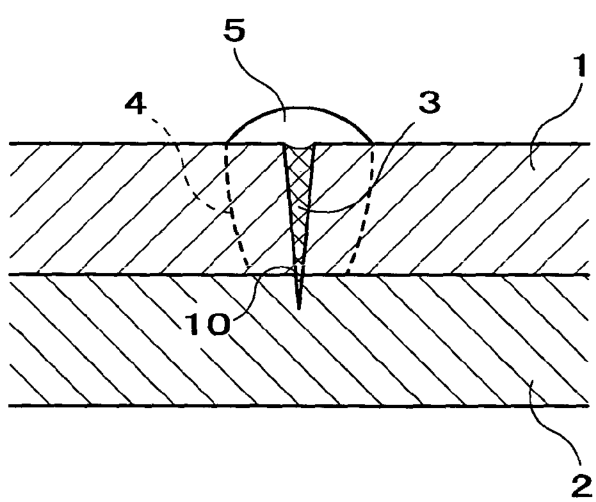
FIG. 3 is a front view in cross section of FIG. 1.

FIG. 1 is a perspective view illustrating welding of plates utilizing a welding process of the present embodiment, FIG. 2 is a side view of FIG. 1, and FIG. 3 is a front view in cross section of FIG. 1.

As shown in FIG. 1, the welding process of the present embodiment is a process in which plates 1, 2 as workpieces are welded utilizing a welding process with emission of a laser light L as a high-density energy beam and a welding process with an arc discharge in combination. Herein, the welding is performed toward a welding direction indicated by an arrow H; i.e., a laser light L is first emitted onto overlapped plates 1, 2 to form a molten portion 3 (hereinafter referred to as laser molten weld pool), and thereafter an arc discharge is performed to form a molten portion 4 (hereinafter referred to as arc molten weld pool). A bead 5 formed as a result of solidification of the arc molten weld pool and molten metal of the filler wire is left behind in the welding direction H.

The plates 1, 2 to be welded are made of iron, aluminum, other metal materials, or alloys such as stainless steel, and the material for the plate 1 may be different from that for the plate 2. Besides such a case as shown in FIG. 1 where the plates 1, 2 are entirely lap-welded, any other forms such as butt-welded, fillet-welded, etc. may be taken.

In FIG. 1, the laser light L to be emitted is so shaped as to converge to a point near a surface of the plate by means of an optical lens or the like provided in a laser light source 6. In addition, the laser light L is controlled so that an optical axis thereof is kept in an orientation perpendicular to or at any other fixed angle with the plates 1, 2.

Among devices usable for the laser light source 3 are for example a YAG laser utilizing an yttrium-aluminum crystal having a garnet structure, and a $CO_2$ laser utilizing carbon dioxide gas. The YAG laser can emit a laser light having several hundred watts of continuous-wave (CW) power at a fundamental wavelength of 1.06 micrometers. The $CO_2$ laser can produce oscillation of a laser light having several tens of kilowatts of continuous-wave power at a wavelength of 10.6 micrometers. The high-density energy beam according to the present invention is not limited to the aforementioned laser lights L; rather, any other laser lights having different wavelengths as well as electron beams may be used. Laser lights operating in a pulsed mode may also be used.

The welding process utilizing an arc discharge is carried out by generating an arc discharge between an electrode wire 8 that extends from an arc welding machine 7 toward the plates 1, 2, and the plate 1, so as to melt the plates 1, 2. At this stage, an inert gas G is blown against the plate 1 from an opening 9 of the arc welding machine 7 formed around the electrode wire 8 in order to prevent faulty welding that could be caused by oxidation of the molten metal. Among welding machines usable for the arc welding machine 7 are for example a MIG (Metal Inert Gas) welding machine, a MAG (Metal Active Gas) welding machine, and a TIG (Tungsten Inert Gas) welding machine. When the MIG welding machine is used, the electrode wire 8 gets molten to serve as a filler wire; when the TIG welding machine is used, a filler wire is fed by a feeding mechanism (not shown) into plasma of the arc discharge.

As shown in FIG. 2, which is a side view of FIG. 1, the arc welding machine 7 is placed so that a longitudinal axis 7A, along which the electrode wire 8 extends, forms a specific lead angle θ1 with the plate 1. The lead angle θ1 is an angle between a vertical axis V of the plate 1 and the longitudinal axis 7A of the arc welding machine 7, which ranges from 0 to 40 degrees. This is for the purpose of ensuring that an inert gas G is sufficiently blown to a point where an arc discharge is carried out on the plate 1 even when the arc welding machine 7 moves forward with respect to the plate 1, so as to reliably prevent the oxidation of the molten metal.

In such a combination welding process as described above, which is performed utilizing the laser light source 6 and the arc welding machine 7, the laser molten weld pool 3 formed by the laser light L is formed, in a relatively narrow region, deeply down to the plate 2 as shown in FIG. 3, which is a front view in cross section of FIG. 3, to form a welded surface 10 at an interface between the plate 1 and the plate 2. Since the area of the welded surface 10 that is formed at this stage is small, welding strength thereof is small. Further, disadvantageously, the surface of the plate 1 is made concave, and is thus likely to cause stress concentration.

Therefore, the present embodiment is designed to generate an arc discharge between the laser molten weld pool 3 formed by the laser light L as described above and the electrode wire 8 of the arc welding machine 7. The plates 1, 2 are further melted across a broadened area by heat associated with the arc discharge before the laser molten weld pool 3 is re-solidified (i.e., immediately after the laser molten weld pool 3 is formed), forming an arc molten weld pool 4. The arc molten weld pool 4 is formed by making use of the laser molten weld pool 3, and is thus formed across a broadened area even with a small quantity of heat generated. The thus-formed arc molten weld pool 4 increases an area welded to combine the plate 1 and the plate 2, and thus increases the welding strength.

When the MIG welding machine is used for the arc welding machine 7, the electrode wire 8 is melted and separated to fall in the form of a droplet onto the arc molten weld pool 4, so that a collar, i.e., the bead 5 can be formed on the plate 1. Consequently, the welded surface of the plate 1 is made convex, and thus stress concentration on the welded surface can be prevented.

According to the welding process of the present embodiment, the welding strength can be made greater in comparison with that achieved when laser welding is performed singly. Moreover, an amount of energy required for welding can be reduced in comparison with that required when arc welding is performed singly; therefore, distortion in the weld between the plates 1, 2 can be reduced, a weld crack is prevented from occurring, and a welding speed can be improved.

The aforementioned effects can considerably be achieved by appropriately setting a distance d as shown in FIG. 2 in a welding direction H between an irradiation position of the laser light L and a central position of the arc molten weld pool 4. The distance d, which varies with outputs of the laser light source 6 and the arc welding machine 7, materials and thicknesses of the plates 1, 2, and the like, is preferably longer than 0 mm, and is 4 mm at the maximum.

One reason therefor is for example like the following: if the distance d between the irradiation position of the laser light L and the central position of the arc molten weld pool 4 were not longer than 0 mm, i.e., if the arc discharge were performed at a position ahead of the irradiation position of the laser light in the welding direction H, a welding operation utilizing an arc discharge would resultantly precede all others, and thus the amount of energy required for welding could not be reduced. Another reason is as follows: if the distance d were not longer than 0 mm, thermal energy of the laser light L would be scattered and absorbed by the arc molten weld pool 4 formed by melting with the arc discharge, and thus the thermal energy derived from the laser light L disadvantageously could not effectively utilized. On the other hand, if the distance d were longer than 4 mm, the plates 1, 2 which were melted once would unfavorably get solidified again.

The distance d may also be considered in light of the welding speed, and it is thus to be understood that the distance d is not subject to the welding speed on the premises that the output of the laser light L is constant and that the amount of electric power supplied for the arc discharge is constant. One reason therefor is for instance like the following: if welding is performed at an increased speed, the amount of energy provided per unit area of the plates 1, 2 and per unit time decreases, and the molten plates 1, 2 are thus more likely to get re-solidified, but the time which elapses since melting takes place by the laser light L until the arc discharge is carried out becomes shorter, with the result that the both effects cancel each other out. Another reason, on the other hand, is as follows: if welding is performed at a reduced speed, the amount of energy provided per unit area of the plates 1, 2 and per unit time increases, but the time which elapses since melting takes place by the laser light L until the arc discharge is carried out becomes longer, with the result that the both effects cancel each other out.

As one example of the present embodiment, lap-joint welding of thick plates (2 mm in thickness) made of aluminum of 5XXX alloy was performed with the distance d being set at 2 mm, using a YAG laser as the laser light source 6 and a MIG welding machine as the arc welding machine 7. The welding strength of 200 MPa or greater was obtained at a speed of 3 m/minute, and reduced welding distortion and prevention of occurrence of a weld crack were observed. This welding speed is adequately high in comparison with that achieved when arc welding is performed singly, while this welding strength is adequately great in comparison with that achieved when laser welding is performed for thick plates. Hereupon, the laser light L outputted 4 kW of continuous-wave power, with a spot diameter of ϕ 0.6–0.8 mm. The MIG welding was performed at current values of 100–250 A and voltage values of 10–25V, and the inert gas G used therefor was argon gas.

Moreover, the present invention is not limited to the above embodiments, and a wide range of various other embodiments may be put into practice.

Figure 4:
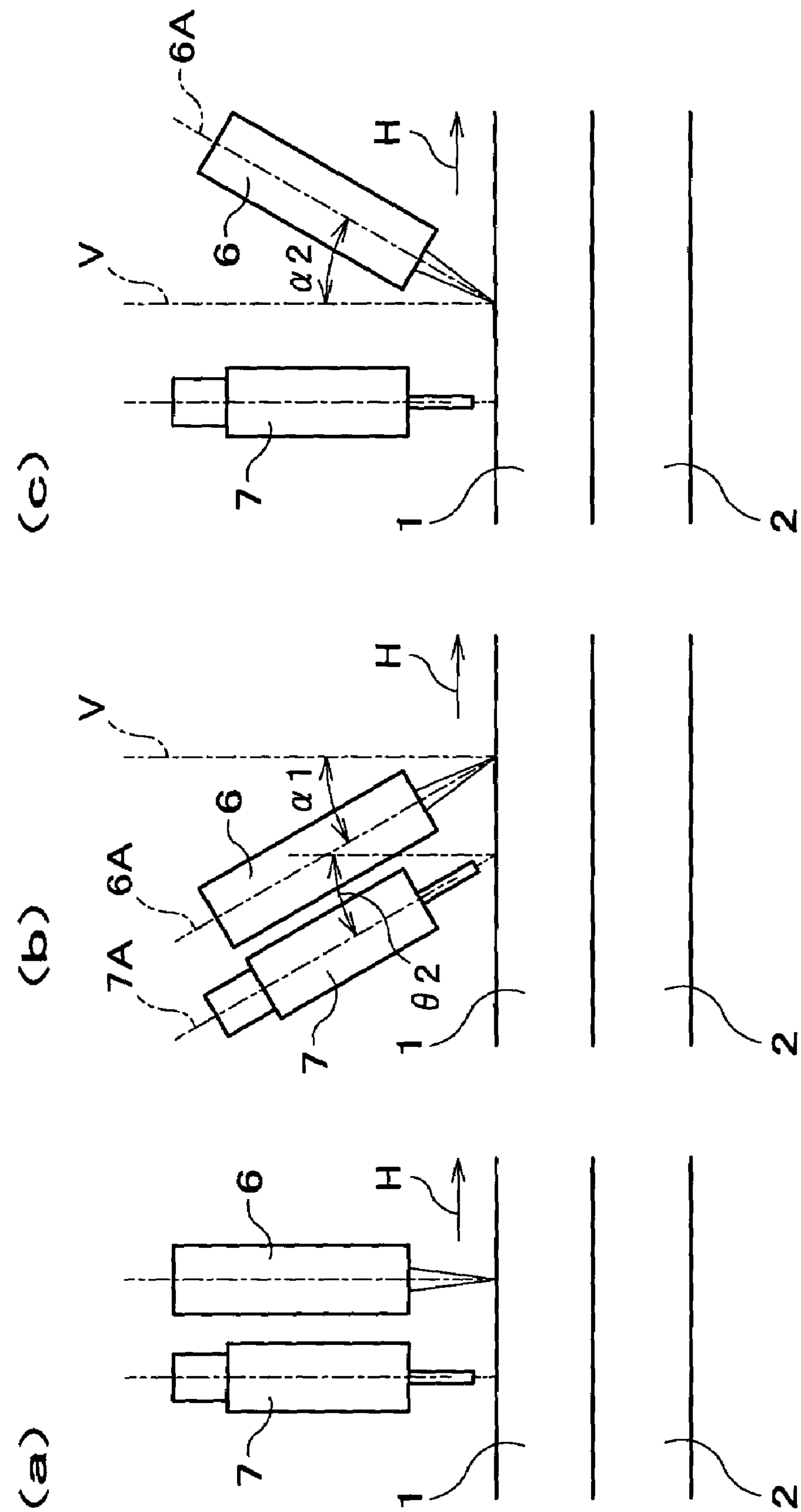
FIGS. 4(*a*), (*b*), (*c*) are side views for explaining an exemplified arrangement of a laser light source and an arc welding machine.

For example, as shown in FIG. 2, the laser light source 6 is disposed in an orientation perpendicular to the plate 1, and the arc welding machine 7 is oriented to form a lead angle θ1, but as shown in FIG. 4(*a*), the laser light source 6 and the arc welding machine 7 may both be disposed in an orientation perpendicular to the plate 1. Such arrangement may be adopted in cases where an inert gas G can be sufficiently blown to an area around a spot in which an arc discharge is generated, for example in a case where welding is performed at a relatively small speed, or others. Alternatively, as shown in FIG. 4(*b*), the laser light source 6, like the arc welding machine 7, may also be oriented so that a longitudinal axis 6A thereof forms a specific lead angle $\alpha$1. The lead angle $\theta$2 of the arc welding machine 7 preferably ranges from 0 to 40 degrees as in the aforementioned embodiment, but the lead angle $\alpha$1 of the laser light source 6 may be set at any angle. Further, as shown in FIG. 4(*c*), the laser light source 6 may be tilted backward in the welding direction H so that backstep welding is performed with a lead angle $\alpha$2 formed. The arc welding machine 7 is disposed in an orientation perpendicular to the plate 1 in FIG. 4(*c*), but may be oriented to form a lead angle $\theta$2 in backstep sequence. In all cases including the aforementioned embodiments, the laser light source 6 and the arc welding machine 7 are disposed on one and the same line parallel to the welding direction H, but may be angled each in a direction other than the welding direction H.

Moreover, an irradiation position of the laser light L and a generation position of arc discharge do not necessarily have to be placed on one and the same line parallel to the welding direction H, and a trajectory of the irradiation position and a trajectory of the arc discharge may be made parallel—if each approximated to a straight line—to each other. In this instance, a component in the welding direction between the irradiation position of the laser light L and the central position of the arc molten weld pool 4 formed by arc discharge corresponds to the distance d as described above.

Further, the distance d does not always have to be kept constant during the welding process, but may be varied within the range as defined above.

Furthermore, instead of continuously welding the plates 1, 2 as shown in FIG. 1, spot welding may be performed at established spacings.

INDUSTRIAL APPLICABILITY

According to the workpiece welding process of the present invention, a preceding high-density energy beam and a following arc welding process are used to weld a workpiece, and thus a welding speed can be improved, while a welding strength can be enhanced.

In addition, the welding process provides a predetermined value to which a distance in a welding direction between a central position of a molten portion formed by emitting the high-energy beam thereto and a position of a tip of an electrode wire of the workpiece welding machine for generating arc discharge is set; therefore energy can be utilized effectively, and energy efficiency as a whole can be enhanced.

The invention claimed is:

1. A welding process for welding a first workpiece to a second workpiece, the method comprising the steps of:

stacking the first workpiece onto the second workpiece;

forming a molten portion on the first workpiece by emitting a high-density energy beam thereto;

immediately thereafter, generating an arc discharge while supplying a filler wire to the molten portion, to weld the first workpiece; and lap welding the workpieces face-to-face, wherein an arc energy passes through the first workpiece into the second workpiece to form a welded surface at an interface between the first workpiece and the second workpiece.

2. A workpiece welding process according to claim 1, wherein a distance between a central position of the molten portion formed by emitting the high-density energy beam thereto and a central position of a molten weld pool formed by the arc discharge is longer than 0 mm, and is 4 mm at the maximum, in a welding direction.

3. A workpiece welding process according to claim 1, wherein the step of generating an arc discharge includes generating an arc discharge with a MIG welding machine.

4. A workpiece welding process according to claim 1, wherein the step of forming a molten portion on the workpiece by emitting a high-density energy beam comprises a YAG laser as the high-density energy beam.

5. A workpiece welding process according to claim 1, wherein the workpiece is formed from a material selected from the group consisting of iron, aluminum, metal materials, stainless steel, and other alloys.

6. A workpiece welding process according to claim 5, wherein the material for the first workpiece is different from the material of the second workpiece.

* * * * *